(12) United States Patent
Rao

(10) Patent No.: US 8,909,860 B2
(45) Date of Patent: Dec. 9, 2014

(54) EXECUTING PARALLEL OPERATIONS TO INCREASE DATA ACCESS PERFORMANCE

(75) Inventor: Ramprasad Nagaraja Rao, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 52 days.

(21) Appl. No.: 13/592,793

(22) Filed: Aug. 23, 2012

(65) Prior Publication Data

US 2014/0059301 A1  Feb. 27, 2014

(51) Int. Cl.
*G06F 13/00* (2006.01)

(52) U.S. Cl.
USPC .......................................................... 711/114

(58) Field of Classification Search
USPC .......................................................... 711/114
See application file for complete search history.

(56) References Cited

U.S. PATENT DOCUMENTS

| | | |
|---|---|---|
| 6,671,781 B1 | 12/2003 | Worrell |
| 2004/0107308 A1 | 6/2004 | Andreev et al. |
| 2005/0132146 A1 | 6/2005 | Kim et al. |
| 2006/0020764 A1 | 1/2006 | Kim et al. |
| 2008/0209129 A1 | 8/2008 | Van De Waerdt et al. |
| 2008/0250270 A1 | 10/2008 | Bennett |
| 2009/0119453 A1 | 5/2009 | Igashira et al. |
| 2011/0022791 A1 | 1/2011 | Iyer et al. |
| 2011/0167192 A1* | 7/2011 | Iyer et al. ........................... 711/5 |
| 2011/0258362 A1 | 10/2011 | McLaren et al. |
| 2012/0054427 A1* | 3/2012 | Huang et al. ................... 711/108 |
| 2012/0054437 A1* | 3/2012 | Huang et al. ................... 711/118 |
| 2013/0046953 A1* | 2/2013 | Iyer et al. ....................... 711/206 |

OTHER PUBLICATIONS

Shah et al: "Fast Incremental Updates on Ternary—CAMS for Routing Lookups and Packet Classification", Aug. 2000, http://yuba.stanford.eduk~pankaj/paps/hoti00.pdf.
Patterson et al.: "Computer Organization and Design", 1998, Morgan Kaufmann, 2nd edition. pp. 545-552 and 579-589.
Fisher-Ogden, John: "Putting Bank Conflicts Behind BARS", 2008, http//cseweb.ucsd.edu/~jfisherogden/bars.pdf.
Shao, Jun et al., A Burst Scheduling Access Reordering Mechanism, Proceedings of the 2007 IEEE 13th International Symposium on High Performance Computer Architecture, Feb. 2007, pp. 285-294, IEEE Computer Society, Washington, DC, United States.

* cited by examiner

*Primary Examiner* — Charles Rones
*Assistant Examiner* — Nanci Wong
(74) *Attorney, Agent, or Firm* — Patterson & Sheridan, LLP

(57) ABSTRACT

Techniques are described for increasing data access performance for a memory device. In various embodiments, a scheduler/controller is configured to manage data as it read to or written from a memory. Read or write access is increased by partitioning a memory into a group of sub-blocks, associating a parity block with the sub-blocks, and accessing the sub-blocks to read data as needed. Write access is increased by including a latency cache that stores data associated with a read command. Once a read-modify write command is received, the data stored in the data cache is used to update the parity block. In a memory without a parity block, write access is increased by adding one or more spare memory blocks to provide additional memory locations for performing write operations to the same memory block in parallel.

20 Claims, 10 Drawing Sheets

EXECUTING PARALLEL OPERATIONS TO INCREASE DATA ACCESS PERFORMANCE

TECHNICAL FIELD

Embodiments presented in this disclosure generally relate to memory management techniques, and more particularly, to increasing data access performance by creating additional ports or channels used to read to and write from a memory storage device.

BACKGROUND

Demand for memory bandwidth on network and switching devices continues to increase. For example, memory bandwidth needs to keep pace with both increases in port density (i.e., with rapidly increasing system port counts) as well as with increases in port speeds (e.g., as port speeds migrate upwards from 1 Gb to 10 Gb to 40 Gb to 100 Gb). Higher density ports and higher speeds translate to larger and faster tables with correspondingly larger aggregate memory and I/O bandwidth requirements. For example, a network-switching device may use memory lookup tables for routing and forwarding network traffic. These tables may include hundreds-of-thousands of entries used for routing millions of network packets.

In these systems, a central processing unit (CPU) or other specialized circuitry (e.g., a field programmable gate array) is configured to route network data received on one port of the device to another port. Firmware running on the network device reads addresses from the lookup table to determine what port a given packet should be forwarded over (based on reading a destination address listed in the packet). As both port density and port speeds increase, the rate at which data can be read from the forwarding table (and from the packet in a buffer) is becoming a limiting factor in the throughput of some network and switching devices.

Further, increases in port density and link speeds also present heavy demands on the memory write capabilities of a networking device. For example, the network device may include buffers used to store a network packet received on one port prior to forwarding the packet out on another port. If the write speeds are insufficient to keep pace with the port speed (and increased port density), packet drops may occur. Similarly, the network device may be configured to write counters values (or other data) to memory for use in traffic monitoring, traffic shaping and for variety of other purposes. Thus, much like the speed at which memory reads occur, the speed at which memory writes occur is becoming a limiting factor for the performance of some network and switching devices.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION

Overview

Figure 1:
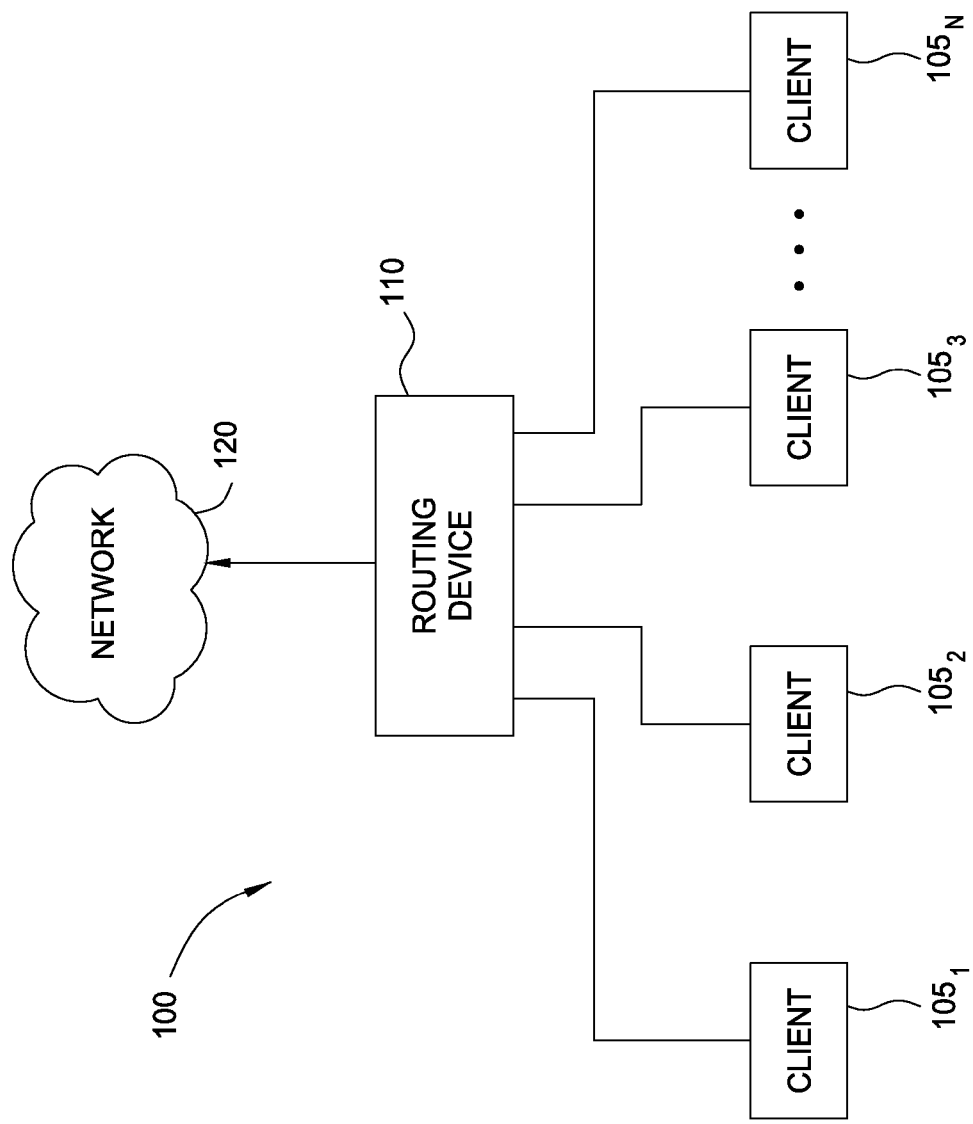
FIG. 1 illustrates an example computing infrastructure, configured according to certain embodiments of the present disclosure.

One embodiment of the present disclosure includes a method for performing a plurality of read operations and a write operation in parallel. The method includes performing a first read operation by reading data at a first memory address in a first block of addresses and, in parallel to the first read operation, performing a second read operation for a second memory address in the first block of addresses by reading data at an address from a second block of memory addresses and a first parity block. Moreover, performing the second read operation includes performing a first exclusive-or (XOR) operation using the data read from the second block of memory addresses and read from the first parity block. The method includes, in parallel to the first and second read operations, performing the write operation by writing data to a third memory address in the first block of addresses. The method includes updating a value in the first parity block in response to the write operation by performing a second XOR operation using at least the data read from at least two other parity blocks.

Another embodiment of the present disclosure includes an apparatus including a memory and memory controller configured to perform multiple read operations and a write operation in parallel. The memory controller performs a first read operation by reading data at a first memory address in a first block of addresses in the memory and, in parallel to the first read operation, performs a second read operation for a second memory address in the first block of addresses by reading data at an associated address from a second block of memory addresses in the memory and a first parity block in the memory. Moreover, performing the second read operation comprises performing a first exclusive-or (XOR) operation using the data read from the second block of memory addresses and read from the first parity block. The memory controller, in parallel to the first and second read operations, performs the write operation by writing data to a third memory address in the first block of addresses. The memory controller updates a value in the first parity block in response to the write operation by performing a second XOR operation using the data read from at least two other parity blocks in the memory.

Another embodiment of the present disclosure includes a method for performing a read-modify write operation. The method includes performing a read operation by reading data at a first memory address in a first block of addresses and, in response to the read operation, storing data from a second block of addresses corresponding to the first memory address into a cache. The method includes, after performing the read operation, performing the read-modify write operation by writing data at the first memory address. While performing the read-modify write operation, the method includes updating a value of a parity block by performing an XOR operation using the data written to the first memory address and the data stored in the cache in response to the read operation.

Another embodiment of the present disclosure includes a method for performing at least three simultaneous write operations. The method includes receiving three write commands associated with a first memory address, second memory address, and third memory address, respectively and determining, by querying both a first and a second memory translation table, that the first, second, and third addresses are each assigned to a first memory block of a plurality of memory blocks. The method includes performing a first write operation to the first memory address in the first memory block. In parallel to the first write operation, the method includes identifying second and third memory blocks from the plurality of memory blocks that each have at least one available memory location, assigning the second memory address to the second memory block and the third memory address to the third memory block, and updating the first memory translation table to indicate that the second memory address is assigned to the second memory block and the second memory translation table to indicate that the third memory address is assigned to the third memory block.

Description of Example Embodiments

Embodiments described herein provide techniques for increasing data access performance for a memory device. In various embodiments, a scheduler/controller is configured to manage data written to and read from a memory. In one embodiment, read access is increased by partitioning a memory into a group of sub-blocks, associating a parity block with the sub-blocks, and accessing the sub-blocks to read data as needed. Data access is increased by allowing simultaneous reads to addresses within the same block to occur—data for one address being read from a sub-block in which the address is located, and data for a second address being read using the combination of the other sub-blocks and the parity block. Further, the memory may be partitioned (and parity blocks added) across n-dimensions. Doing so provides an n+1-fold read performance for completely random access (necessary for general-purpose applications) without introducing a throughput penalty due to access collisions. This topic is also discussed in co-pending U.S. patent application Ser. No. 12/870,566 filed Aug. 27, 2010 entitled "Increasing Data Access Performance", which is incorporated herein by reference in its entirety.

Further, a memory partitioned to include at least two dimensions may also provide a write access advantage. In this case, the memory may perform both a read operation and a write operation in parallel, even if the sub-blocks are capable of performing only one read and one write per memory access cycle. Because each time a sub-block is written to the corresponding parity block (or blocks) are updated, the memory may use the other parity blocks (e.g., row and column parity blocks) to update the parity block. Doing so enables the memory to perform a conflict-free read operation in parallel to the write operation. As used herein, a "memory access cycle" is typically one clock cycle of the memory's clock. However, in some embodiments, a memory access cycle may extend over several clock cycles. For example, a read-modify write operation is pipelined to avoid wasting bandwidth. That is, if read-modify write operations are received at time 0, time 1, and time 2, they may complete at time 2, time 3, and time 4. Thus, to the user it appears as if an operation is completed every clock cycle even though the memory access requires two clock cycles.

In another embodiment, a memory partitioned to include at least one parity block may be associated with a latency cache that stores data in response to previous read operations performed by the memory. Subsequently, the memory may receive a read-modify write command which instructs the memory to perform a write operation that updates value of the data that was previously read from the memory. For example, the read-modify write command may store in the memory an updated value of a counter that was incremented. The data stored in the latency cache during the previous read command may be accessed once the read-modify write command is received in order to update a value stored in the parity block. Doing so, permits the memory to perform other operations during the read-modify write, such as a separate read operation, without having to add duplicative hardware or memory blocks with additional read or write ports.

In still another embodiment, write speeds are improved through a set-associative organization of memory blocks. Write access is increased by partitioning memory into blocks, and associating an additional block of equal size with the primary data blocks in a set-associative manner. For example, if the set includes four blocks to which data for an address may be written, then a fifth, additional block is added. These five blocks form an associative set. Providing an additional memory block ensures that a free block is always available when two conflicting write operations are performed. For example, if each memory block can perform only one write operation per cycle but the two write operations provide addresses that both map to the same block, one write operation is performed in the originally addressed block while the other write operation is performed in the additional memory block. In this manner, the memory can perform two writes in the same cycle, regardless of whether the received write addresses are assigned to the same memory block. Moreover, applications of this embodiment are not limited to ones that are set-associative. For example, embodiments may be adapted for use with a First-in-First-Out (FIFO) data structure. Further still, in one embodiment, the increased write performance due to the set-associative mechanism is expanded to include two additional memory blocks. Accordingly, the memory may perform three write operations in the same cycle even if all three received addresses are assigned to the same memory block. That is, because the two additional memory blocks guarantee that there are at least two available storage locations per associative set, the memory performs two of the three write operations in the available memory locations.

Description of Example Embodiments

The following description is presented to enable one of ordinary skill in the art to make and use the proposed techniques. Descriptions of specific embodiments and applications are provided only as examples and various modifications will be readily apparent to those skilled in the art. The general principles described herein may be applied to other embodiments and applications without departing from the scope of the disclosure. Thus, the present disclosure is not to be limited to the embodiments shown, but is to be accorded the widest scope consistent with the principles and features described herein. For purpose of clarity, features relating to technical material that is known in the technical fields related to the proposed ideas have not been described in detail.

Further, a particular embodiment is described using a memory management unit on a network routing device configured to read from and/or write to a memory on the routing device. However, it should be understood that embodiments described herein may be adapted for a broad variety of memory or storage devices, including, e.g., DRAM, SRAM, or SDRAM memory modules (or other memory modules), disk drives, flash memory devices, or networked storage devices, etc. More generally, any memory or storage space that can be partitioned, logically or physically, into a group of blocks can be adapted to use the techniques described herein to increase read/write performance. Accordingly, references to the particular example of a memory management device on a network routing device are included to be illustrative and not limiting.

FIG. 1 illustrates an example computing infrastructure 100, configured according to certain embodiments of the present disclosure. As shown, a routing device 110 includes an uplink to a network 120. Note, the routing device may include multiple uplinks to the network 120 (e.g., multiple 10 Gb Ethernet ports). Additionally, the routing device 110 includes links to multiple clients $105_{1-N}$. The routing device 110 is generally configured to route network traffic to/from the network 120 for the connected client devices $105_{1-N}$. As described in greater detail below, the routing device 100 may include one or more memories and a scheduler configured to read/write data to the memories. For example, FIG. 2 is a block diagram further illustrating the routing device 110 of FIG. 1, according to certain embodiments of the present disclosure.

Figure 2:
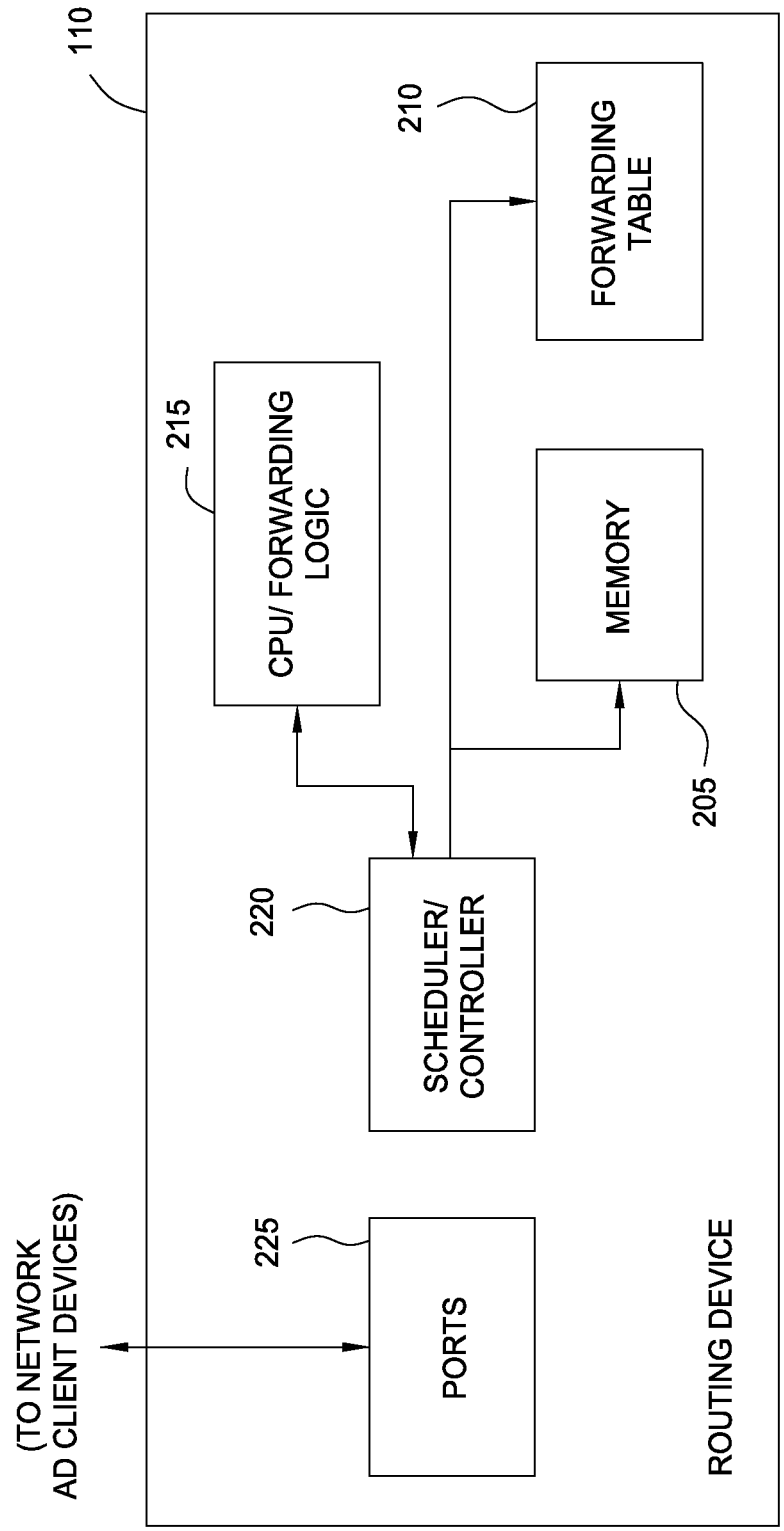
FIG. 2 is a block diagram further illustrating the routing device of FIG. 1, according to certain embodiments of the present disclosure.

As shown in FIG. 2, the routing device 110 includes a memory 205, and a forwarding table 210, a central processing unit (CPU)/forwarding logic 215, a controller/scheduler 220 and ports 255. Of course, one of ordinary skill in the art will recognize that the depiction of a network routing device shown in FIG. 2 is simplified to highlight aspects of the disclosure and further, that, in practice, network devices may be configured with a variety of additional functions, features and components.

In this example, ports 225 include both upstream ports, such as one or more high-speed uplinks (e.g., 10 Gb) to another network and also includes ports used to connect a collection of clients to the routing device 110. The clients may be computing systems (e.g., servers in a data center) as well as other networking devices. CPU 215 provides a processing unit configured to forward traffic received over one of the ports 225. The scheduler/controller 220 is configured to control the follow of data being written to or read from the memory 205 and/or the forwarding table 210. For example, the controller 220 may write network data is received over one of the ports 225 to a buffer in the memory 205. In response, the CPU 215 may request that the controller 220 read a memory address from the forwarding table 210 in order to determine a port over which to forward the traffic. That is, the forwarding table 210 generally provides a lookup table mapping ports on the device to the address of a device connected to a given port (e.g., mapping a port ID to a MAC address of a network interface card).

In one embodiment, the forwarding table 210 may be implemented as a ternary content addressable memory (TCAM) and the memory 205 may be any combination of fixed or removable memory chips or modules (e.g., DRAM, SDRAM, SRAM). Further, as described in greater detail below, embodiments of the disclosure provide a variety of techniques for configuring the controller 220, memory 205 and/or forwarding table 210 in order in order to increase memory read performance and memory write performance.

Figure 3:
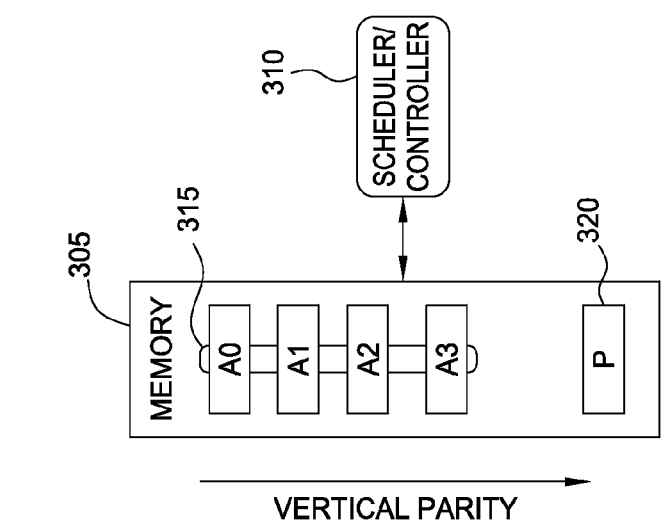
FIG. 3 illustrates an example of a memory configured to use a memory parity block to increase read performance, according to certain embodiments of the present disclosure.

For example, FIG. 3 illustrates an example of a memory 305 configured to use a memory parity 320 block to increase read performance, according to certain embodiments of the present disclosure. As shown, the memory 305 is partitioned into four equal-sized blocks 315, labeled A0, A1, A2 and A3. Each memory block 315 may include a read port which allows the scheduler/controller 310 to read an address in that block. A variety of approaches may be used to partition memory 305 into blocks 315, including, e.g., using a modulus or hash value and using uniform physical block splits. In one embodiment, a "memory block" is a unit of physical memory storage that includes at least one port or interface for receiving data for performing a read or write operation. For example, the memory block may include only one interface that may be used to either write data to the block or read data from the block during each cycle (i.e., a 1 R/W memory). Alternatively, the memory block may include a plurality of ports such as one read port and one read port that permit the block to perform a write operation and read operation in parallel during the same memory access cycle (i.e., a 1R1W memory). Nonetheless, in other embodiments, a memory block may be logical partition of a larger memory storage element.

In addition to the four blocks 315, the memory 305 also includes a parity memory block 320. The parity block 320 is sized to be same depth as each of the memory blocks 315 (whether partitioned logically or physically). The parity block 320 stores a parity result generated from the contents of a given address across all the blocks. As shown, the parity values run vertically, and a parity value may be obtained by performing a logical exclusive or (XOR) using the contents of an address in each of the blocks 315. The resulting parity value is stored in parity block 320. The parity value may be used to recover data for an address in the event of a failure in one of the blocks 315. The parity value P stored in block 320 may be represented mathematically as follows:

$$P = A0 \oplus A1 \oplus A2 \oplus A3 \tag{1}$$

where "$\oplus$" corresponds an XOR operation. The value for an address in a given block 320 can be recovered by XORing the contents of the other blocks with the parity value. For example, a value stored in A0 at a particular address can be recovered as follows:

$$A0 = P \oplus A1 \oplus A2 \oplus A3 \tag{2}$$

In one embodiment, the parity block 320 is used to provide an additional user read port or channel, allowing the scheduler/controller 310 to perform two simultaneous reads from the same block to occur. That is, controller 310 has two available choices for reading a given memory address. First, the exact memory block in which an address is stored, and second, the remaining data and parity blocks.

In order to read two addresses simultaneously, the controller 310 first determines whether the addresses being read are present in different blocks 315. If yes, i.e., if no read collision occurs, than the controller 310 reads the contents of two different blocks. Otherwise, if a collision occurs (i.e., the reads are for different addresses in the same block 315) then one address is read from the target block and the other is read using the non-target memory blocks and the parity block. Accordingly, although not shown, the memory 305 may include two separate read ports for receiving two read addresses from the scheduler/controller 310 during each command cycle.

Figure 4:
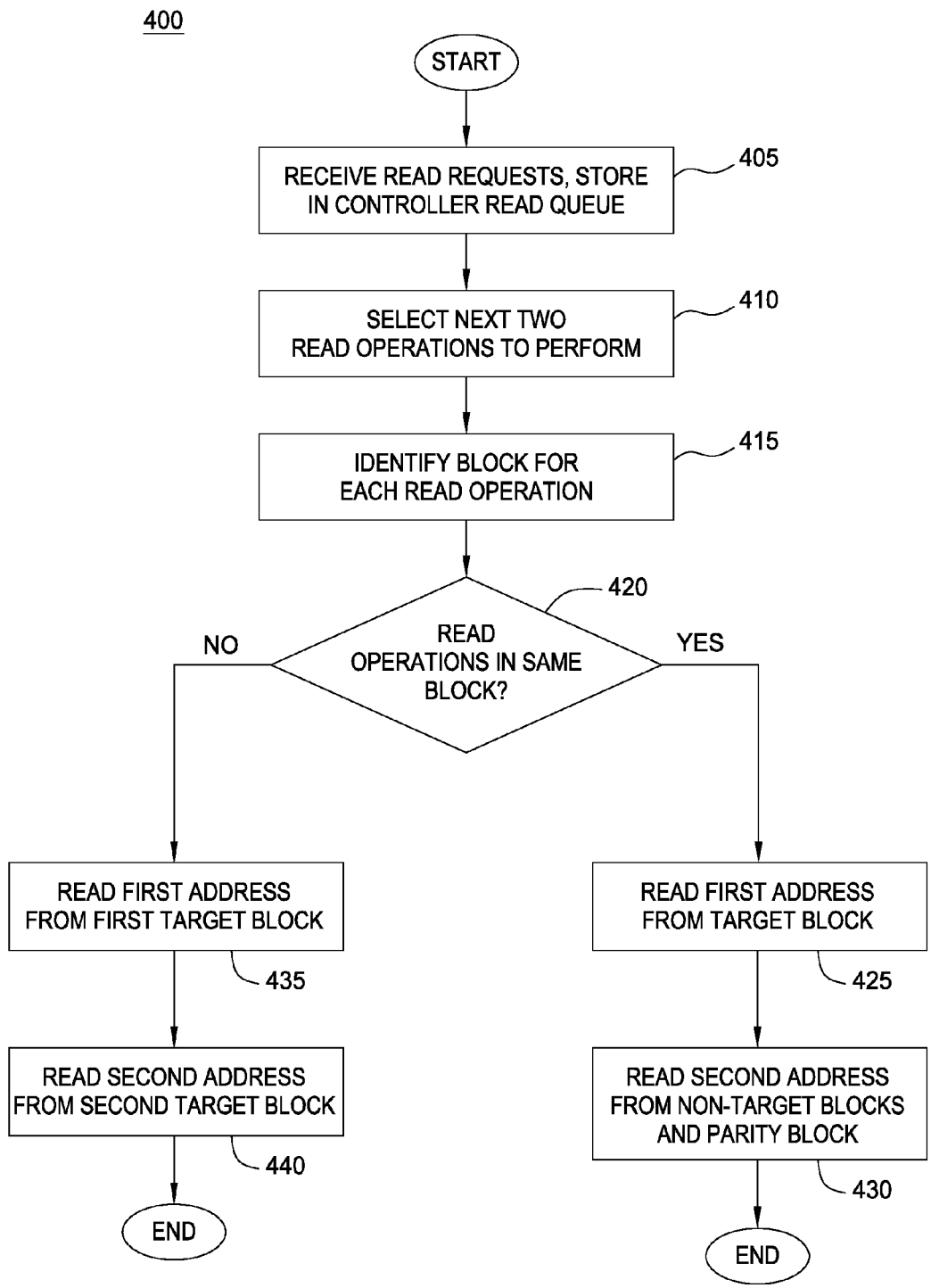
FIG. 4 illustrates a method 400 for performing multiple read operations from a memory, according to certain embodiments of the present disclosure.

FIG. 4 illustrates a method 400 for performing multiple read operations from a memory, according to certain embodiments of the present disclosure. As shown, the method 400 begins at step 405, where the controller receives read requests. The requests may be stored in a read buffer associated with the controller. At step 410, the controller selects the next two read operations to perform. At step 415, the controller identifies a target block (logical or physical) associated with each of the two the read operations.

At step 420, the controller determines whether the two read operations target the same block. If not (i.e., if the read operations target different blocks), then at step 435, the controller reads a first address from a first target block and at step 440 reads a second address from a second target block. Otherwise, if the controller determines that the two read operations target the same block, then at step 425, the controller reads a first address from the target block common to both addresses. And at step 430, reads a second address from the target block by XORing the value from the identified address in each non-target block and the parity block. Thus, regardless of the whether two addresses target the same or different blocks, the memory controller can read two addresses during each read cycle.

Performing at Least Three Simultaneous Reads

Figure 5:
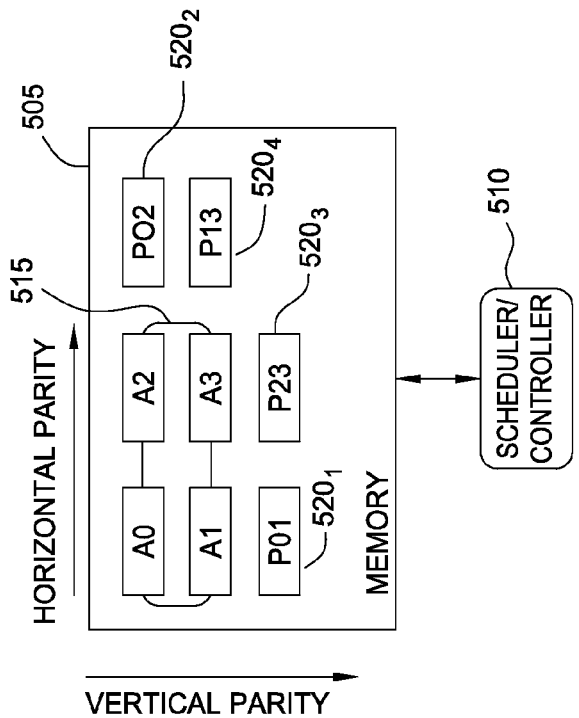
FIG. 5 illustrates an example of a memory 505 configured to use memory parity blocks 520 to increase read performance across multiple dimensions, according to certain embodiments of the present disclosure.

Further, the approach of using a parity block to increase read access performance may be extended to higher dimensions. For example, FIG. 5 illustrates an example of a memory 505 configured to use memory parity blocks 520 to increase read performance across multiple dimensions, according to certain embodiments of the present disclosure. As shown in FIG. 5, a memory 505 is partitioned into four blocks 515, labeled A0, A1, A2 and A3. Additionally, four parity blocks 520$_{1-4}$ are used to determine a parity value from vertical or horizontal pairs of the blocks 515. For example, parity block 520$_1$ (P01) provides a parity value computed from blocks A0 and A1. Similarly, parity block 520$_2$ (P02) provides a parity value computed from blocks A0 and A2. More generally, each block 515 is a member of two parity combinations, one running vertically and one running horizontally. This arrangement allows memory controller 510 to read three separate addresses from a memory block 515 simultaneously. For example, to read three separate addressees from block A0, the controller 510 reads a first address in A0 directly, with the other two reads using the vertical and horizontal parity groups. That is, the controller 510 reads a second address as A0=P01⊕A1 and reads a third address as A0=P02⊕A2.

One of skill in the art will recognize that the parity block approach to increasing read performance discussed above has many possible arrangements and is not limited to an arrangement of memory blocks in square or rectangular arrays. Consider, e.g., an array of seven memory blocks, in such a case, five parity blocks could be used to achieve a tripling of read performance by ensuring that each of the seven memory blocks is associated with two distinct parity groups. That is, to allow each of seven memory blocks to participate in two distinct parity groups requires five parity blocks. Similarly, using eleven parity blocks would allow each of the seven memory blocks to participate in three distinct parity groups, resulting in a quadrupling of read performance. More generally, each one of n-fold increases in read performance requires an additional parity group for each memory block.

Performing at Least Two Reads and One Write Simultaneously

The memory 505 may be used to perform at least two reads and one write simultaneously (2R1W), even if these three operations all map to the same memory block. Further, the read and write operations may have uncorrelated or random addresses—i.e., the reads and write are not dependent on each other. For this embodiment it is assumed that each of the physical memory blocks 515, 520 in memory 505 have a dedicated read port (or interface) and a dedicated write port. That is, each memory block 515, 520 is capable of performing one read and one write simultaneously (1R1W). Furthermore the blocks 515, 520 may read an old value from, as well as write a new value to, the same address simultaneously. Table 1 illustrates one possible example of reading the values stored in Address X and Address Y and writing a new value to Address Z from memory block A0 in parallel. Note that this example is not intended to be limiting but rather to illustrate the worst case scenario, i.e., performing two read and one write operations the map to the same memory block.

TABLE 1

| Reading from/Writing to Block A0 | |
|---|---|
| Read Address X | Read using read port of A0 |
| Read Address Y | Read using read ports of A2 and P02 |
|  | Perform the operation A2 ⊕ P02 |
| Write to Address Z | Write using write port of A0 |

To complete the 2R1W operations in one cycle, the parity blocks P02 and P01 must also be updated to reflect the new data value stored at Address Z. Focusing on P02, there are at least two ways of updating this parity block. One, the old values in blocks A0, A2, and P02 corresponding to Address Z are retrieved and XORed, or two, the new value in A0 and the corresponding value for Address Z in A2 are retrieved and XORed. In either case, as shown in Table 1, the read ports of A2 and P02 are already occupied performing the reads for the values corresponding to Address Y and cannot be used in the same cycle to read the values corresponding to Address Z.

Instead, the two dimensional structure of memory 505 permits 2R1W operations, as well as updating both of the parity blocks, to occur simultaneously by using the other parity blocks to update P01 and P02. Stated in general terms, these two parity blocks may be updated using the following logic:

$$\text{New P02=Old P02} \oplus \text{Old A0} \oplus \text{New A0} \tag{3}$$

$$\text{New P01=Old P01} \oplus \text{Old A0} \oplus \text{New A0} \tag{4}$$

New P02 and New P01 represent the updated values that are stored in these blocks in response to the new data being written into Address Z in A0. Old P02 and Old P01 represent the old values written in P02 and P01 that correspond to the old data in Address Z before the memory 505 received the write command. Old A0 represents the old value stored at Address Z in A0 while New A0 represents the new value that is currently being written into Address Z in A0.

New A0 is known since it was received by the scheduler/controller 510 when 2R1W operations began. Old A0, however, is derived since the read port of A0 is busy retrieving the value stored in Address X as shown in Table 1. One possible example of deriving Old A0 is as follows:

$$\text{Old A0=A1} \oplus \text{Old P01} \tag{5}$$

When performing the logic illustrated in equation 5, the controller 510 uses the read ports of A1 and P01 to retrieve the values corresponding to Address Z to derive the old value stored at Address Z in A0. This derivation avoids having to retrieve the old value of Address Z directly from A0.

Moreover, in the embodiment shown in Table 1, the controller 501 is unable to retrieve the value of Old P02 directly from that memory block, since the read port of P02 is being used to fetch the value corresponding to Address Y. Thus, the controller 501 may derive Old P02 as follows:

$$\text{Old P02} = \text{Old P13} \oplus \text{Old P23} \oplus \text{Old P01} \quad (6)$$

As shown, Old P02 is derived by reading the corresponding values stored in P13, P23, and P01. Thus, XORing the different parity memory blocks 520 permits controller 510 to derive the value corresponding to Address Z in P02. Note that in this embodiment, the value read from P01 is being used at least twice: once to derive Old A0 and once to derive Old P02. However, because the same value is being retrieved from P01, only one read port is needed. That is, the controller 510 simply copies and routes the data retrieved via the read port of P01 to logic necessary to derive both Old A0 and Old P02, and thus, memory block P01 needs only one read port.

Once Old A0 and Old P02 are derived using equations 5 and 6, respectively, the controller 501 may use these values to perform equation 3 and find the updated or new value of P02. For example, the controller 510 may use the following logic to derive New P02 by substituting equations 5 and 6 into equation 3:

$$\text{New P02} = (\text{P13} \oplus \text{P23} \oplus \text{P01}) \oplus (\text{A1} \oplus \text{P01}) \oplus \text{New A0} \quad (7)$$

Moreover, equation 7 can be further reduced since the two occurrences of P01 nullify each other:

$$\text{New P02} = \text{P13} \oplus \text{P23} \oplus \text{A1} \oplus \text{New A0} \quad (8)$$

A similar process may be followed to derive the new value of P01 using equation 4. However, Old P01 does need to be derived from the values stored in the other parity memory blocks as done to derive Old P02 in equation 6 since Old P01 is currently being read from P01's read port as shown in equation 5. Accordingly, equation 4 may be rewritten as:

$$\text{New P01} = \text{Old P01} \oplus (\text{A1} \oplus \text{Old P01}) \oplus \text{New A0} \quad (9)$$

In equation 9, equation 5 is substituted into equation 4 to yield New P01. In this manner, the controller 510 may perform the logic detailed in equation 8 and 9 to yield the new, updated values associated with Address Z in each of the parity blocks 520₁ and 520₂. The controller 510 then writes these values into the respective parity blocks 520₁ and 520₂ using their respective write ports while simultaneously performing the 2R1W operations.

Equations 3-9 and the example shown in Table 1 are for illustration purposes only. One of ordinary skill will recognize the different manner in which a multi-dimensional memory may be used to perform two reads and one write whose addresses are associated with the same memory block. Moreover, different logic may be employed to find the various data required to update the parity blocks. For example, instead of using equation 9 to find New P01, this value may be derived as follows:

$$\text{New P01} = \text{A1} \oplus \text{New A0} \quad (10)$$

Performing at Least One Read and One Read-Modify Write Simultaneously

Many memory systems write data that was modified based on a previous read. For example, a counter retrieves data from a memory, increments the data, and stores the incremented data in the same address. Other computational functions, such as statistical data or a MAC learn for updating routing data, also perform a similar operation where retrieved data is updated and written back into memory in a later operation. In this manner, the later in time write operation is based on a read operation that occurred in a previous memory access cycle. As used herein, this type of write is referred to as a "read-modify write". The previous read is an indicator that a subsequent write will occur. Stated differently, the read-modify write is dependent on the previous read.

Figure 6A:
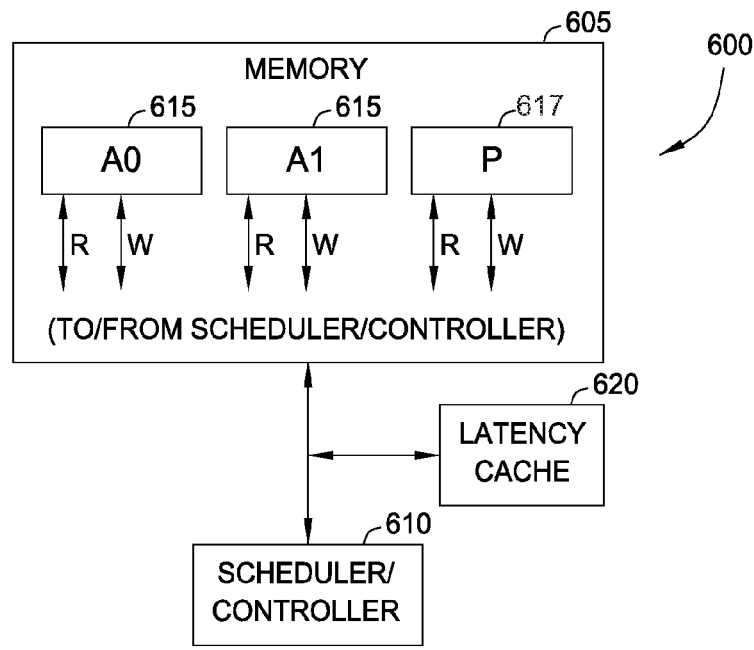
FIGS. 6A-6B illustrate a memory system for performing a read-modify write, according to certain embodiments of the present disclosure.

FIG. 6A illustrates a memory system 600 for performing a read-modify write. In one embodiment, the scheduler/controller 610 is configured to perform a read-modify write and at least one read operation in parallel. Moreover, the read-modify write and the read operation may be independent. That is, the read-modify write and the read operation may be random accesses that are unrelated. However, the read-modify write may be related to a read operation that was performed in a previous cycle.

The latency cache 620 stores some of the data associated with previous read operations in the memory 605. For example, if the controller 610 used the memory blocks A1 and P to derive a value stored in A0, the value retrieved from A1, P, the derived value of A0, or combinations thereof may be stored in the latency cache 620. Furthermore, the latency cache 620 may index the stored data based on the address associated with the read operation. For example, if the read operation requested the value stored at Address X on A0, the cache 620 may use Address X to provide an index for the data stored in the cache 620. Thus, a later read-modify write that writes a modified value to Address X can access the cache 620 to retrieve the previously stored data. However, in other embodiments, different identifiers may be used to index data in the latency cache 620 such as a cycle number or a time stamp. In general, the identifiers permit a subsequent read-modify write operation to locate related data stored in the latency cache 620.

As shown, each memory block 615, 617 in memory 605 is a 1R1W memory with separate read and write ports or interfaces that permit the memory 605 to read data from and write data to the blocks 615, 617 in parallel. Moreover, the system 600 includes the parity block P 617 for enabling two read accesses to be performed in parallel. Although not shown, the system 600 may include a multi-dimensional structure like, for example, the memory 505 shown in FIG. 5. By extending the dimension of the structure and adding other parity blocks—e.g., column parity blocks, the system 600 may be expanded to support more complex parallel operations such as three reads and one read-modify write.

In one embodiment, the scheduler/controller 610 indentifies when it performs a read operation that retrieves data from an address that will later be used for a read-modify write. For example, the scheduler 610 may include a separate port that receives read commands that will be followed by a read-modify write operation to the same address. Each time the scheduler 610 receives a read command at that port, a portion of the data retrieved is stored in the latency cache 620. Alternatively, when decoding a read command, the controller 610 may identify a type of the command. If the read type indicates that the command will be followed by the read-modify write, the control 610 stores some portion of the data in memory 605 into the cache 620.

Table 2 illustrates an example of using the latency cache 620 to perform a read-modify write operation.

TABLE 2

| Time | Operation(s) | Latency Cache Action |
|---|---|---|
| Time 1 | Read Address X of A0 | Store corresponding value of A1 |
| Time 2 | Read-modify write new value to Address X of A0 | Retrieve value of A1 to update parity block P |

At time 1, the controller 610 receives a command to perform a read operation on Address X of A0. While performing this operation, the controller 610 determines that the read data is related to a future read-modify write and stores a least a portion of data associated with Address X into the latency cache 620. In the example illustrated in Table 2, the controller 610 stores the value of A1 that corresponds to Address X of A0 into the latency cache 620. The cache 620 may also a store an identifier into the latency cache 620 to enable the controller 610 to locate the data when the related read-modify write operation is performed.

After the read operation is performed, the controller 610 transmits the retrieved data to the computing element that requested the data. For example, the computing element may be a counter, statistical application, MAC learn application, and the like. Once the retrieved data has been modified, at time 2, the computing element instructs the controller 610 to perform a read-modify write operation to store the modified data back into Address X. Although time 2 may be the next sequential cycle to follow the read operation performed at time 1, this is not a requirement. Between time 1 and time 2, the memory system 600 may have performed a plurality of different operations and stored data to the latency cache 620 that is related to different read-modify write operations.

When performing the read-write operation, the controller 610 writes the modified data to Address X of A0. Additionally, the controller 610 updates the corresponding location in the parity block P based on the value stored at Address X. One technique of updating the parity block P is XORing the corresponding values in A0 and A1 as shown in equation 1. The value of A0 was received at the controller 610 along with the read-modify write command and the value of A1 may be retrieved using A1's read port. Using A1's read port, however, means the controller 610 is unable to use the read port of A1 for a different read. For example, to perform one read and one read-modify write operations in parallel, if the read operation requests data stored in A1, either this data cannot be retrieved or the parity block P cannot be updated. Accordingly, if the one read and one read-modify write operations are unrelated (i.e., random) then, in certain situations, the memory 605 in unable to perform the two operations in parallel.

Alternatively, the controller 610 may rely on data stored in the latency cache 620 to perform a read operation and read-modify write operation simultaneously, regardless of which memory blocks 615 map to the received addresses. Specifically, instead of using the read port of A1 to retrieve the necessary data to update parity block P, the controller 610 may use an identifier to index into the latency cache 620 and retrieve the value of A1 that was stored during time 1. Accordingly, if the read operation instructs the controller 610 to retrieve data stored in A1, the controller 610 is free to do so. For example, controller 610 may use the address of the read-modify write operation (e.g., Address X) to hash into latency cache 620 and retrieve the value of A1 stored previously. The controller 610 XORs this value with the modified value and writes the result in P using the parity block's write port. In this manner, the read operation may access any of the read ports of the memory 605, even including the read port of parity block P.

Table 3 illustrates another example of using the latency cache 620 to perform a read-modify write operation for any number of memory blocks.

TABLE 3

| Time | Operation(s) | Latency Cache Action |
|---|---|---|
| Time 1 | Read Address X of A0 | Store value of Address X in A0 and corresponding value in P |
| Time 2 | Read-modify write new value to Address X of A0 | Retrieve values stored at Time 1 to update parity block P |

Figure 6B:
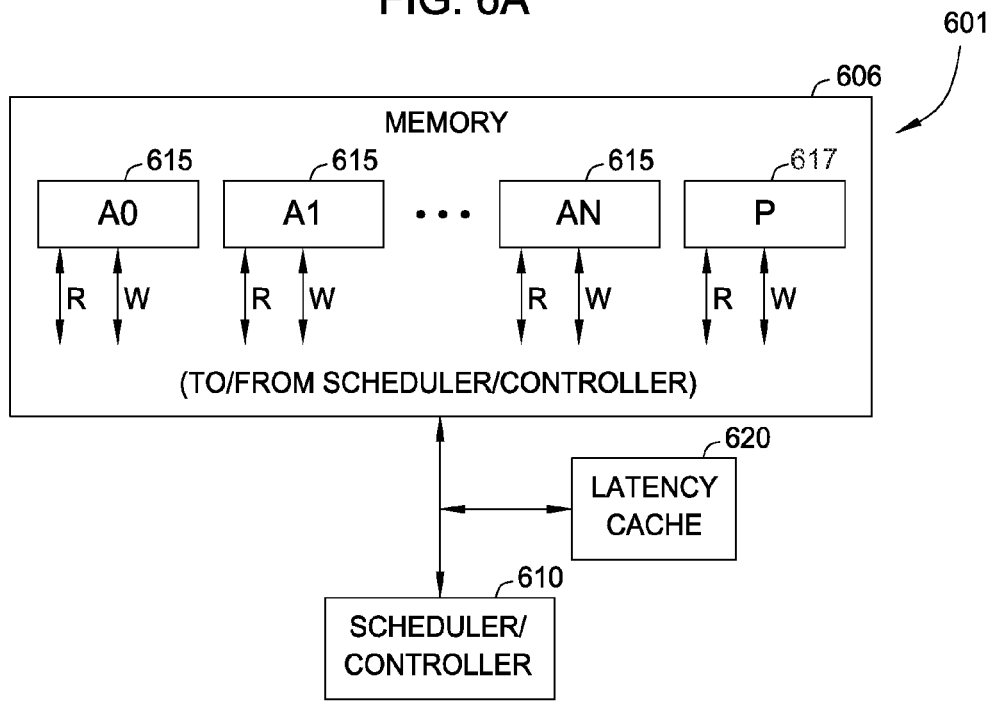

As shown in FIG. 6B, the memory system 601 includes components similar to the components shown in FIG. 6A, however, instead of having only two memory blocks 615 with the parity block P 617, any number of memory blocks 615 (A0 through AN) may be associated with a single parity block in the memory 606.

At time 1, the controller 610 performs a read operation to retrieve the value stored at Address X in A0. In response to this operation, the controller 610 also stores the retrieved value of Address X and the corresponding value of P into the latency cache 620 and transmits the retrieved value to the requesting computing element.

After modifying the retrieved value, the controller 610 receives a read-modify command at time 2 to store the modified data into Address X. In addition to writing this information into A0, the controller 610 updates the parity block P to reflect the modified data. However, if the controller 610 simply XORs the modified data with the corresponding values stored in A1 through AN, this prevents those read ports from being used to perform one or more simultaneous read operations. Accordingly, the controller 610 may retrieve the stored values in the latency cache 620 to update the corresponding value in P using the following logic:

$$\text{New P} = \text{Old P} \oplus \text{Old A0} \oplus \text{New A0} \quad (11)$$

Old P and Old A0 represent the values that the controller 610 stored in the latency cache 620 during time 1. New A0 is the modified data received by the controller 610 and the New P is the updated value corresponding to Address X that is then stored in parity block P. In this manner, the read ports for all the memory blocks 615 in memory 606 remain available to perform at least one read operation in parallel to the read-modify write operation.

In one embodiment, instead of storing Old P and Old A0 in the cache 620, at time 1, the controller 610 may save the values of A1-AN corresponding to Address X into the latency cache. Thus, when updating the parity block P, the modified value of A0 and the stored values of A1-AN may be XORed. Further still, in another embodiment, the controller 610 determines which values are stored in the cache 620 based on read port availability. For example, in addition to retrieving data from A0, assume at time 1 the controller 610 also performed a read operation that fetches data from parity block P corresponding to a different address. Because the read port of P is busy, the controller 610 instead stores into the latency cache 620 the values of A1-AN which are then used to update P as shown by equation 1.

Similarly, the method shown in Table 2 may be modified such that the value corresponding to Address X of A0 and the correspond value in P are saved rather than only the value in A1 if, for example, the read port of A1 was busy at time 1. Thus, the parity block in the example shown in Table 2 may also be updated using logic similar to that shown in equation 11.

Performing at Least Two Simultaneous Write Operations

Figure 7:
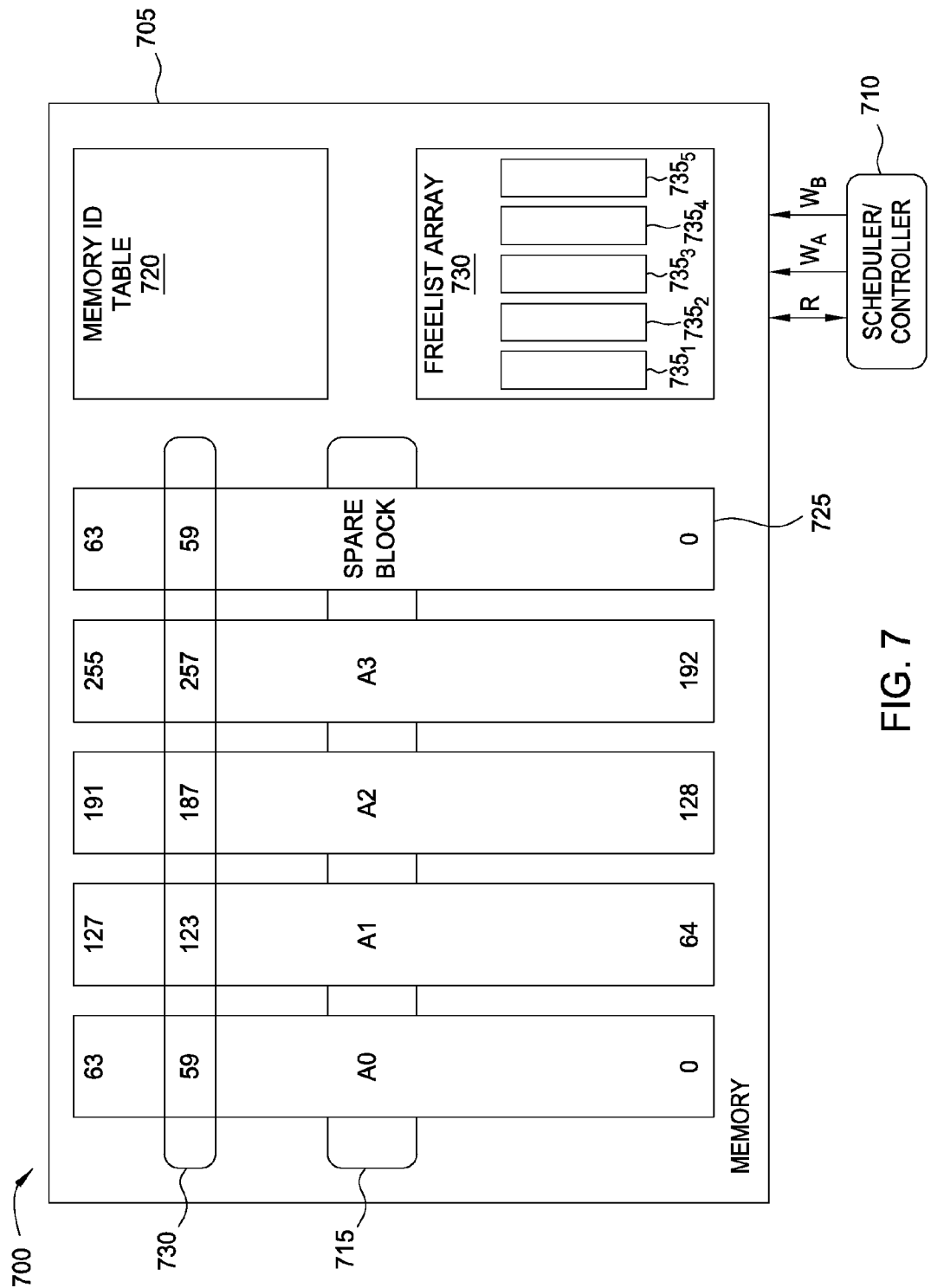
FIG. 7 illustrates an example architecture used to increase write performance, according to certain embodiments of the present disclosure.

The write performance may be increased by dividing the memory into blocks and then adding an extra memory block. For example, FIG. 7 illustrates an example architecture 700 used to increase write performance according to certain embodiments of the present disclosure. As shown, a memory 705 is partitioned into four equal-sized blocks 715, labeled A0, A1, A2 and A3. In this example, each block 715 provides an address space of 64 values—resulting in a total address space of 256 useable addresses in memory 705. Corresponding addresses in each block forms a 4-way set. For example, the memory addresses at locations 59, 123, 187 and 251 together form a set. In this case, a set may be identified using six lower-order bits of an address in the 0-255 range. For example, the six-lower order bits of 59, 123, 187 and 251 are the same in binary—111011. Because the two most significant bits in the full 8 bit address are not used as physical address of memory 705, the full 8 bit address may be referred to as virtual address.

Additionally, memory 705 includes a spare block 725, also 64 addresses deep. The useable size of memory 705 remains 256, but using five blocks to store a 4-way set, as depicted for memory 705, guarantees that at least one location in any set is always unoccupied. In other words, the spare block 725 creates an additional write port for the memory 705. The spare block 725 ensures that scheduler/controller 710 can always perform two write operations during a given read/write cycle.

More generally, to gain a write port (i.e., write port $W_B$), a memory of useable depth of D may be partitioned into X blocks each with a depth of D/X. In the example of FIG. 7, X=4, D=256, and thus D/X=64. Accordingly, blocks 715 are each 64 addresses deep. Note, each block may also have the same bit-width W. Once partitioned into X blocks, a spare memory block 725 of D/X depth and width W is added to the memory. Moreover, in one embodiment, each of the memory blocks 715 are one read or one write physical memories (1R/W). In this case, the architecture 700 permits at least one read and one write or two writes in the same cycle. In another embodiment, each of the memory blocks 715 are one read and one write memories (1R1W). Here, the architecture 700 permits at least one read and two writes to occur simultaneously. The following discussion is based on using 1R1W memory blocks 715 that enable 1R2W per cycle, although the present disclosure is not limited to such.

The controller 710 uses the one read and two write ports to transmit up to three unique addresses to the memory 705. If the two write addresses are stored on different memory blocks 715 than there is no conflict and the three operations may be performed in parallel. However, if the write addresses map to the same block 715, then there is a conflict. Specifically, the memory 705 uses the memory ID table 720 to identify write conflicts. The memory ID table 720 includes a table that correlates each address in the addressable memory space (D=256) to a particular memory block 715 which stores the value corresponding to that address. For example, the address of $W_A$ and the address of $W_B$ are compared to determine whether the addresses are assigned to the same block 715. If so, a conflict exists and the memory 705 can write only one of the values corresponding to $W_A$ and $W_B$ to the identified memory block 715. The spare block 725 ensures, however, that there exists at least one alternative location where the other value can be written. Moreover, the memory ID table 720 may include two identical copies of the memory mapping (e.g., two separate physical memory blocks) to permit the addresses received on ports $W_A$ and $W_B$ to be evaluated in parallel.

After detecting a conflict, the memory 705 uses the freelist array 730 to identify the memory block 715 with the available memory location. The freelist array 730 is guaranteed to identify at least one memory location where the conflicting write may be performed. As shown, the freelist array 730 includes one memory block 735 that corresponds to each of the blocks 715—i.e., block $735_1$ corresponds to A0, block $735_2$ corresponds to block A1, and so forth. Accordingly, the memory blocks 735 may have the same depth as the memories 715 (i.e., D/X=64). Assuming $W_B$ is chose to be written to a different memory block 715, the memory 705 may use the 6 least significant bits (LSB) of the address sent to the memory 705 on write port $W_B$ to index into each of the freelist memories $735_{1-5}$. One of the five memories 735 is guaranteed to have a memory location that is available or free. For example, the freelist memories 735 may store a one if the location is free (invalid) or a zero if the location is taken (valid). In one embodiment, once the memory 705 is initialized, all of the memory locations in the spare block 725 are free while the memory locations in the other memory blocks 715 (i.e., A0-A3) are taken. Thus, once the first conflict occurs, one of the write operations is performed into the spare block 725. However, after continued operation, two simultaneous write may both map to the spare block 725 which would require at least one of these write operations to be performed in a different memory block 715.

Figure 8:
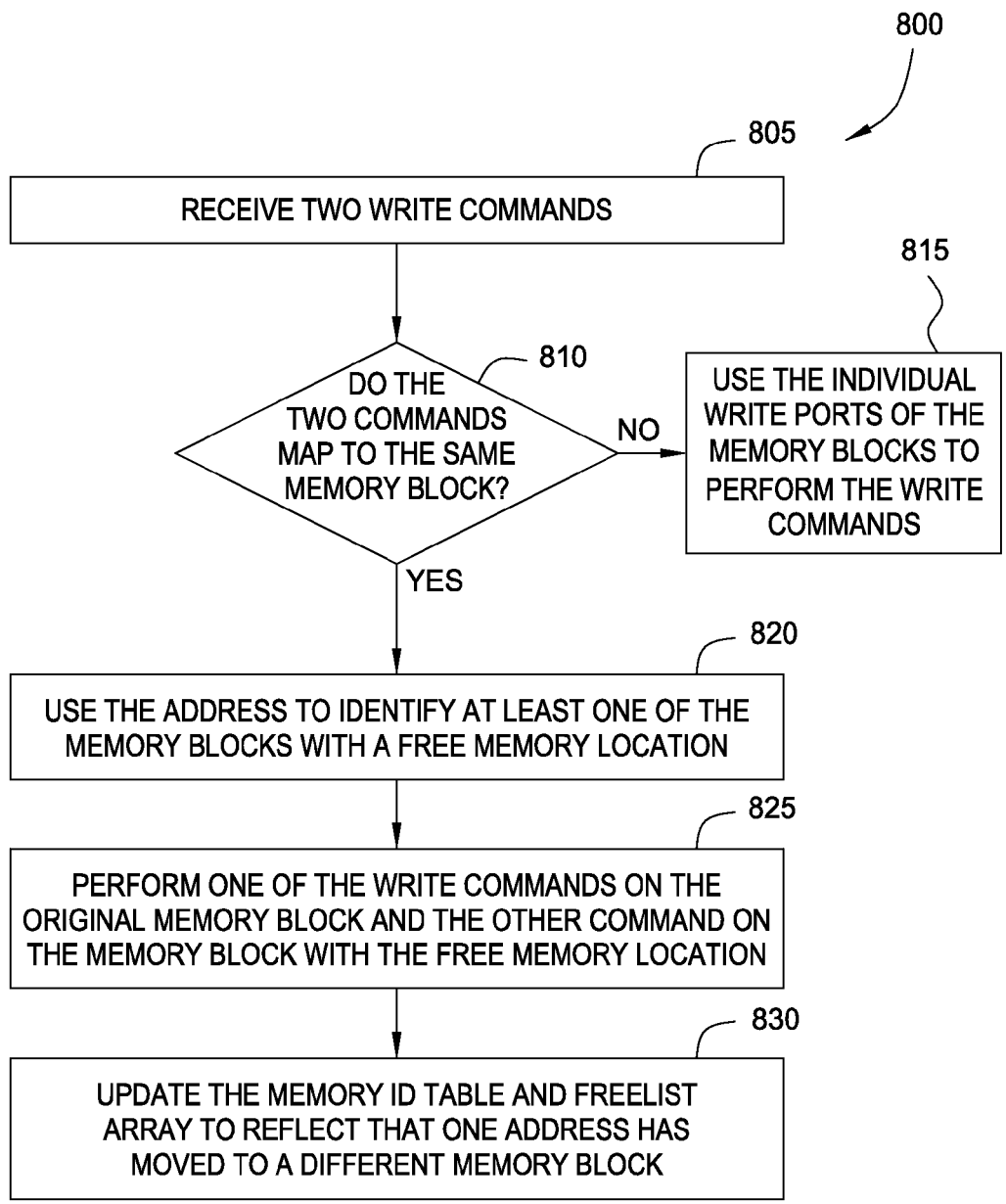
FIG. 8 illustrates a method of performing two simultaneous writes, according to certain embodiments of the present disclosure.

FIG. 8 illustrates a method of performing two simultaneous writes, according to certain embodiments of the present disclosure. For clarity, method 800 will be described with reference the memory architecture 700 discussed in FIG. 7. Method 800 begins at block 805 where the memory 705 receives two write commands on two separate write ports—e.g., $W_A$ and $W_B$. At block 810, the memory determines whether the two write commands map to the same memory block 715. For the discussion here, assume that port $W_A$ receives Address X and $W_B$ receives Address Y which both map to A0. That is, the memory 705 uses the memory ID table 720 to determine which memory block or blocks 715 store the data associated with Addresses X and Y. If the addresses map to different memory blocks 715, at block 815 the method 800 uses the individual write ports of the identified memory blocks 715 to perform the write commands. If the addresses map to the same memory block 715, however, there is a conflict.

At block 820, the memory 705 uses the LSBs of Address X and Y to identify at least one memory block 715 with a free memory location. The number of LSBs needed is dependent on the depth of the memory blocks 715 in the memory 705. As shown in FIG. 7, only the six LSBs are needed to address each row in the memory blocks 715 (i.e., identify a 4-way set), and thus, each memory 735 in the freelist array 730 is 64 rows deep. However, this architecture may vary depending on the particular memory architecture.

At least one of the received write addresses—e.g., Address Y—is compared to the memories $735_{1-5}$ in the freelist array 730 to determine a free memory location. That is, one of the five memories $735_{1-5}$ includes an invalid or free bit corresponding to each set in the memory 705—i.e., there are at least 64 invalid memory locations in the memory blocks 715. In this manner, the six LSBs of Address Y may be used to identify which memory block 715 has the free memory location for that particular set.

At block 825, the memory 705 writes one of the commands to the original memory block 715 and the other command to the memory block 715 with the free memory location. For example, the memory 705 may write the value received on port $W_A$ to the memory block 715 identified in the memory ID table 720 but use the freelist array 730 to determine a free location for the value received on port $W_B$. State differently, the memory 705 moves, or assigns, Address Y that was received on port $W_B$ to a different memory block 715.

At block 830, the memory 705 updates the memory ID table 720 and the freelist array 730 to reflect that Address Y has moved to a different memory block 715—e.g., from A0 to A3. Specifically, the memory ID table 720 now indicates that Address Y is located in A3 while the freelist memory $735_5$ corresponding to A3 now has a valid or taken bit corresponding to the six LSBs of Address Y. Moreover, the freelist memory $735_1$ corresponding to the previous location of Address Y—A0—is updated to contain the invalid or free bit. Thus, if Address Y needs to be moved again because of a conflict, the memory ID table 720 and freelist array 730 reflect that Address Y is now stored in A3 and that A0 contains a free memory location for the set. In this manner, the memory ID table 720 and freelist array 730 work in tandem to translate logical addresses—i.e., addresses received at the write ports—to physical addresses—i.e., the particular memory blocks 715 where the values corresponding to the addresses are stored. Thus, any application reading data from or writing data to memory 705 does not know which memory block 715 actually stores the value corresponding to the read or write address.

Performing at Least Three Simultaneous Write Operations

Figure 9:
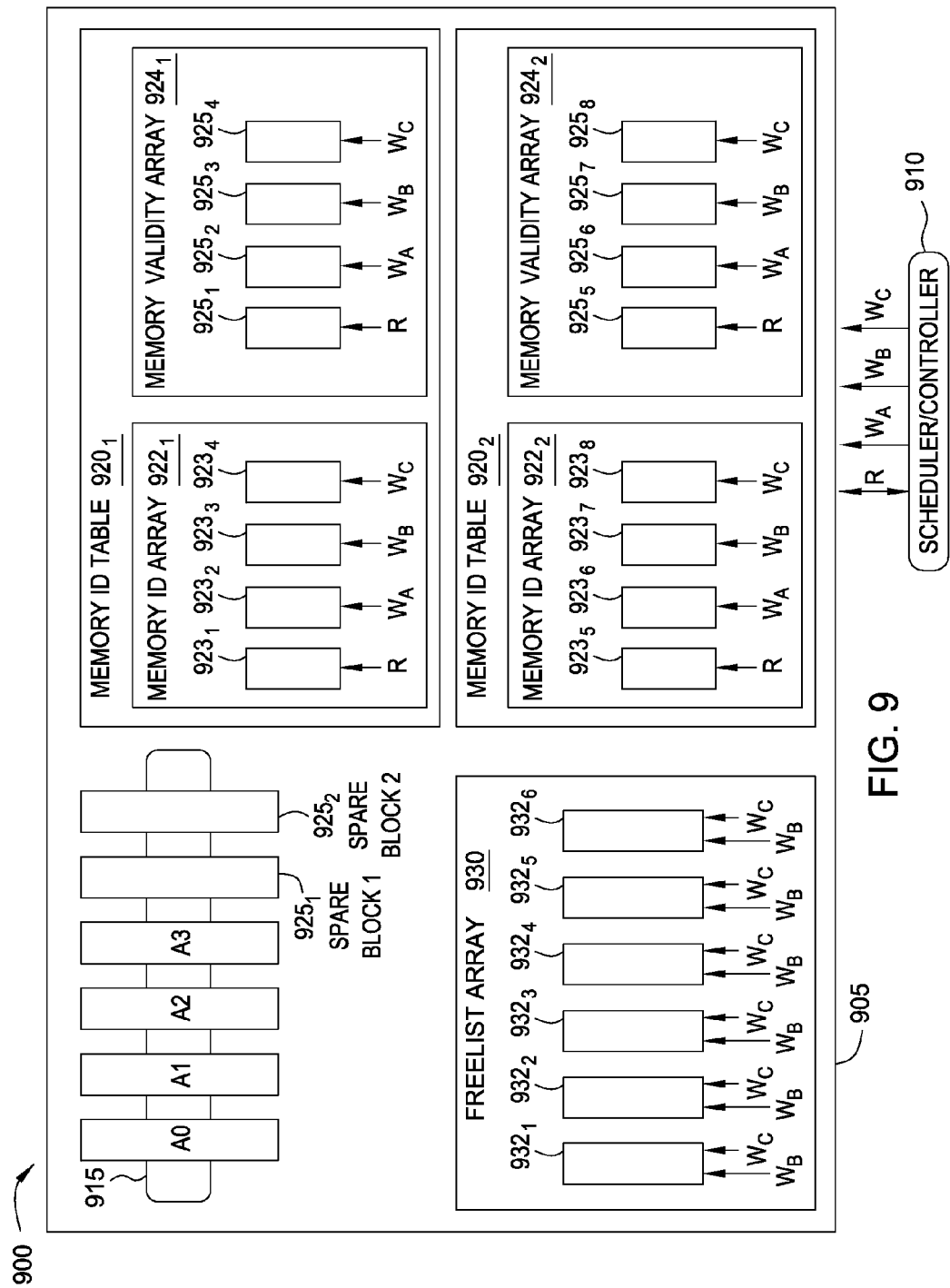
FIG. 9 illustrates memory architecture for performing three simultaneous writes, according to certain embodiments of the present disclosure.

FIG. 9 illustrates memory architecture for performing three simultaneous writes, according to certain embodiments of the present disclosure. Specifically, the architecture 900 expands the architecture 700 shown in FIG. 7 to include at least two additional spare blocks $925_{1,2}$. Moreover, the memory translation unit—i.e., the memory ID tables $920_{1,2}$ and the freelist array 930—are reconfigured to handle a cycle where three write operations map to the same memory block 915. That is, the memory 905 receives three different addresses on write ports $W_A$, $W_B$, and $W_C$ that each map to the same memory block 915. Although the following discussion focuses on the worst case scenario—receiving three write operations that map the same memory block 915—the memory 905 is able to perform three simultaneous write operations if there is a conflict between only two of the write port addresses or if there are no conflicts.

Like in FIG. 7, the memory 905 includes a total addressable space of 256 addresses but use two spare blocks $925_{1,2}$ to expand the memory 905 to include 384 memory locations to enable simultaneous writes for conflicting write operations. Memory 905 includes two different memory ID tables $920_{1,2}$ for detecting and managing conflicts. Each memory ID table $920_{1,2}$ includes a memory ID array 922 and memory validity array 924. The memory ID arrays $922_{1,2}$ include at least four memory blocks $923_{1-4}$ that correspond to the number of read and write ports of the memory 905. As shown here, the memory ID arrays $922_{1,2}$ have respective memory blocks $923_{1-4}$ for the read port (R) and the three write ports ($W_A$, $W_B$, and $W_C$). In general, the addresses received on read and write ports are sent to the respective memory blocks $923_{1-4}$ to determine a corresponding memory block 915 tasked with storing the value of that address.

The memory validity arrays $924_{1,2}$ includes four memory blocks $925_{1-4}$ that each correspond to a memory block $923_{1-4}$ in the memory ID arrays $922_{1,2}$—e.g., memory block $925_1$ corresponds to memory block $923_1$, memory block $925_2$ corresponds to memory block $923_2$, and so forth. The addresses for each of the read and write ports (or some other identifier) are used to index into the memory units $925_{1-4}$ and determine if the memory block 915 identified in the memory block 923 of the memory ID array 922 is valid. For example, if Address X is received on write port $W_A$, memory unit $923_2$ may reflect that Address X is assigned to A2, but if the memory block $925_2$ in the memory validity array 924 stores an invalid bit corresponding to Address X, then the memory 905 disregards the information retrieved from the memory block $923_2$ in the memory ID array 922. For each address received on the memory's 905 ports, only one of the two storage locations produced by the two memory ID arrays $922_{1,2}$ will be valid. That is, for any given address, only one of the memory ID tables $920_{1,2}$ stores in the memory ID array 922 the correct memory block 915 while the other memory ID array 922 stores an invalid memory location. In this manner, the depth of the memory blocks $923_{1-4}$ and $925_{1-4}$ are at least as deep as the total addressable memory of the memory 905—e.g., 256. However, memory blocks $925_{1-4}$ may be narrower in width than memory blocks $923_{1-4}$ since the blocks $925_{1-4}$ may only store a validity bit while memory blocks $923_{1-4}$ may store a three-bit code for uniquely representing each of the memory blocks 915. The reason for maintaining two memory ID tables $920_{1,2}$ will be discussed later.

If comparing the valid memory locations retrieved from the memory ID tables 920 indicate at least one conflict, the memory 905 uses the freelist array 930 to determine a suitable substitute memory block 915 for the conflicting addresses. In the case of three write addresses mapping to the same memory block 915, the freelist array 930 uses one or more of the write addresses—e.g., the write addresses received at ports $W_B$ or $W_C$—to index into the memory units $932_{1-6}$. These units $932_{1-6}$ include one or more memory blocks that are indexed using the addresses received on the memory's 905 write ports. Providing at least two memory blocks in each unit 932 ensures that two received address can be indexed in the same cycle. That is, the memory blocks may have only one read port, and thus, to determine whether the corresponding memory block 915 has an available memory location the memory units $932_{1-6}$ include at least two identical memory blocks.

However, if only two of the write addresses conflict, then only one of the conflicting addresses is used to index into the freelist array 930. For example, if the addresses received on ports $W_B$ and $W_C$ conflict, then value received at the data port (not shown) of $W_B$ may be written to the memory location provided by the memory ID tables 920 while the address of port $W_C$ may be used to index into the memory units $932_{1-6}$ to identify an available memory location to store the value received on the data port (not shown) of $W_C$.

As discussed, each of the memory units $932_{1-6}$ in the freelist array 930 corresponds to a memory block 915. That is, memory unit $932_1$ corresponds to A0, memory unit $932_2$ corresponds to A1, and so forth. Based on the memory configuration shown in FIG. 9, the six LSBs (64 unique memory locations) of the received address are used to index into the memory blocks of the memory units $932_{1-6}$. The memory blocks store a free/taken bit corresponding to the LSBs (i.e., a free/taken bit per row of the memory blocks) that represents whether that particular memory location in the corresponding memory block 915 is available. Because the memory 905 includes two spare blocks 925, at least two memory locations for each 4-way set in the memory blocks 915 are guaranteed to be available. By searching each memory unit $932_{1-6}$ of the freelist array 930, the memory 905 identifies at least two free memory locations for each the addresses received on write port $W_B$ and write port $W_C$. The freelist array 930 may have further logic to ensure that the same substitute memory block 915 is not selected for the received addresses.

Moreover, the addresses may map to the same memory blocks 915 even if the addresses are not part of the same set. For example, the freelist array 930 may identify that A0 and A2 have available memory locations for the address received on write port $W_B$ and A2 and Spare Block 1 include available memory locations for the address received on write port $W_C$. Because in one embodiment each memory block 915 can perform only one write per cycle, the memory 905 may write the data value corresponding to port $W_B$ to A2 but write the data value corresponding to port $W_C$ to Spare Block 1.

As discussed relative to FIG. 9, memory unit 932 stores data to enable simultaneous indexing using two different addresses. Thus, the memory blocks in memory unit 932 should be updated when memory address are moved or assigned to different memory blocks 915. For example, if all three write addresses map to A0 but the memory 905 decides to move two of those addresses (e.g., Address Y and Z) to A1 and A2, then the memory blocks in memory unit $932_1$, memory unit $932_2$, and memory unit $932_3$ are updated. In regards to the memory blocks in memory unit $932_1$, the availability bits corresponding to Address Y and Z need to reflect that these memory locations are now available. However, this requires two writes to be performed in memory unit $932_1$. If the memory blocks in memory unit $932_1$ are implemented using 1R/W or 1R1W memories, these memories are incapable of performing the two writes necessary to change two validity bits in the same cycle.

Figure 10:
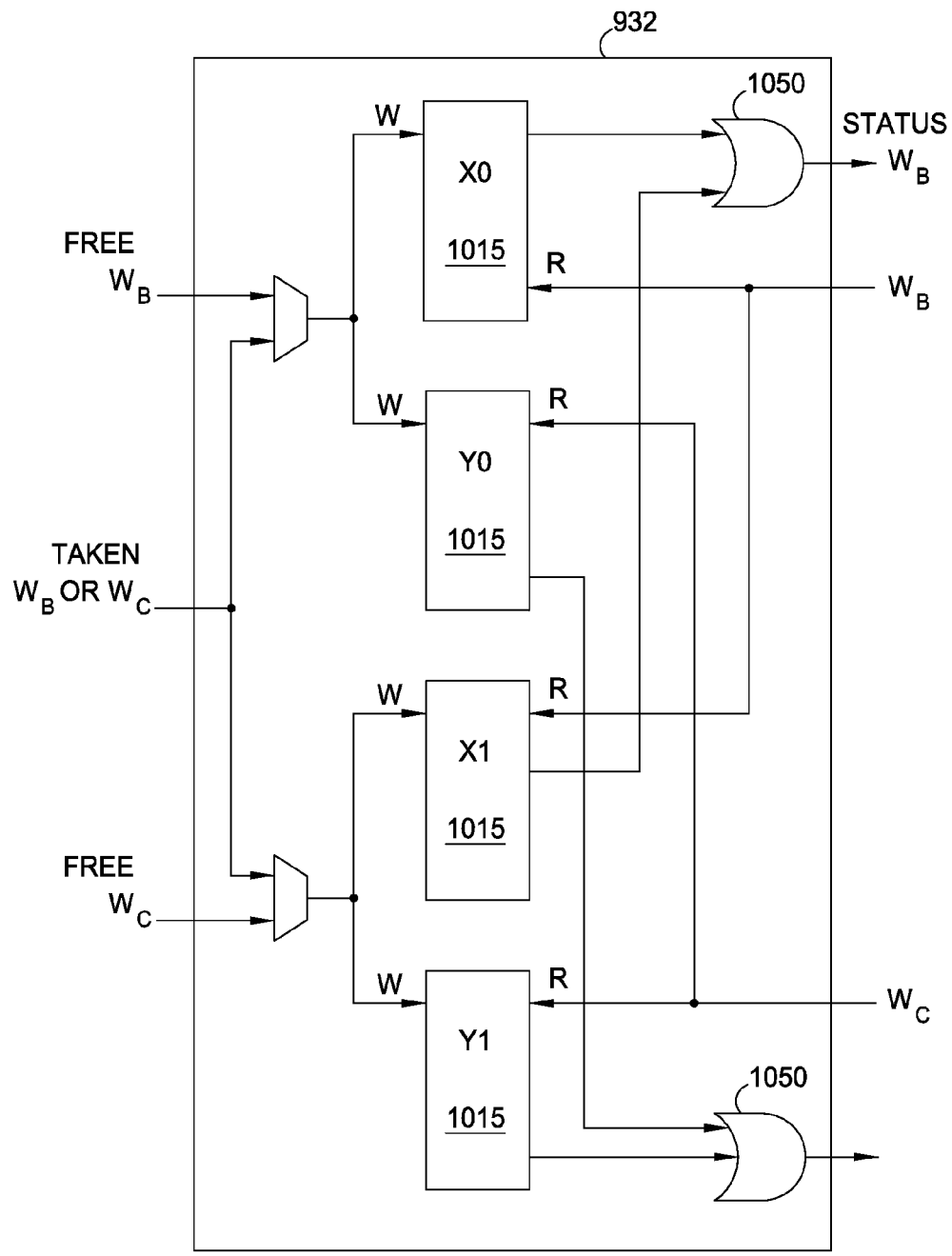
FIG. 10 illustrates memory architecture for updating the memory units in a freelist array, according to certain embodiments of the present disclosure.

FIG. 10 illustrates a memory architecture for updating the memory units in a freelist array, according to certain embodiments of the present disclosure. Specifically, FIG. 10 illustrates a single memory unit 932 of the freelist array that uses four memory blocks 1015 to ensure each memory unit 932 can update two availability bits in the same cycle—i.e., in parallel. As shown, the memory unit 932 includes four physical memory blocks 1015—X0, X1, Y0, and Y1—that are 1R1W memories, although the present disclosure is not limited to such.

Memory unit 932 includes two read interfaces for receiving the addresses associated with ports $W_B$ and $W_C$. Each read interface couples to two of the memory blocks 1015. As shown, the LSB portion of a received address is used to index into two of the memory blocks—X0 and X1 or Y0 and Y1—using their respective read ports. The resulting availability bit is then transferred to the OR gates 1050 and used to determine whether the memory block 915 in FIG. 9 corresponding to the memory unit 932 has an available memory location at that address. For example, if either memory block X0 or X1 returns a "1", the memory unit 932 indicates that the memory location is available or free. However, if both memory blocks X0 or X1 return a "0", the memory unit 932 indicates that the memory location is taken and is not a suitable memory block 915 for storing the value received at the write port.

Assume that all three addresses received on ports $W_A$, $W_B$, and Wc conflict and map to memory block A0 shown in FIG. 9. If the memory unit shown in FIG. 10 is the memory unit $932_1$ that corresponds to block A0, Status $W_B$ and Status $W_C$ signals both yield a "0"—i.e., the memory locations are taken. Further assume that the addresses associated with $W_B$ and $W_C$—Address X and Address Y, respectively—are moved to memory block A1 and A2, respectively. This means that the memory locations corresponding to the LSBs of Address X and Y in A0 are now invalid. To update the memory unit 932 associated with A0, Address X and Y are transmitted on the Free $W_B$ and Free $W_C$ signals, respectively. The Free $W_B$ signal writes a "1" into the rows of X0 and Y0 that correspond to the LSB portion of Address X, while Free $W_C$ signal writes a "1" into the rows of X1 and Y1 that correspond to the LSB portion of Address Y. The next time these address are received on either of the $W_B$ or $W_C$ ports, at least one of the memory blocks 1015 will return a "1" to indicate the memory location is now available. For example, if Address Y is subsequently received on port $W_B$ (instead of port $W_C$), once this address reaches the read interface of memory unit 932, X1 returns a "1" since this block 1015 was changed by Free $W_C$ in a previous cycle, but X0 may return a "0" since this block 1015 was not changed by Free $W_B$ or Free $W_C$. Nonetheless, the OR gate 1050 reports that the memory location is available in the corresponding memory block 915. Accordingly, when Address X or Y are received on either of the write ports, the Status $W_B$ and Status $W_C$ signals return a "1" indicating the memory locations for both of these addresses is available.

Continuing the example above, assume that the memory unit 932 shown in FIG. 10 is the memory unit $932_2$ corresponding to the memory block A1. Because the address of port $W_B$ was moved to memory block A1, the memory unit 932 is updated to reflect that the once unavailable memory location corresponding to Address X is now taken. Accordingly, while the received value is stored into A1, the memory unit 932 transmits the LSBs of Address X on the Taken signal. This writes into all the memory blocks 1015 the taken bit (e.g., "0") to indicate the memory location is unavailable. The same update may be performed on the memory unit 932 corresponding to the memory block A2—i.e., the new location of Address Y received on port $W_B$. In this manner, the circuit schematic shown in FIG. 10 may be repeated for each memory unit $932_{1-6}$ in FIG. 9 to enable at least two reads and two writes during one cycle to track and update the availability of the memory locations in the memory blocks 915.

In FIG. 10, the taken signal is mutually exclusive with both the Free $W_B$ and Free $W_C$ signals. For example, the memory 905 may control the selector signals to the multiplexors to ensure the taken signal is never applied with either of the Free $W_B$ or Free $W_C$ signals. The Free $W_B$ and Free $W_C$ signals, however, may be active simultaneously (in the case of three-write conflict) or one at a time (in the case of a two-write conflict).

In addition to updating the different memory units $932_{1-6}$ in the freelist array 930, the memory ID tables $920_{1,2}$ are also updated to reflect the changes made in where the addresses are stored. Returning to FIG. 9, the memory 905 includes two memory ID tables $920_{1,2}$ that each contain a memory ID array $922_{1,2}$ with four memory blocks $923_{1-4}$ and $923_{5-8}$ corresponding to the four read and write ports of the memory 905. The memory 905 includes two copies of the memory ID table 920 (which may or more not store identical data in the memory ID arrays $922_1$ and $922_2$) for enabling the new location of the two addresses to be updated in parallel. For example, if there was only one memory ID table 920 but two addresses (e.g., Address X and Address Y) were moved to two different memory blocks 915, each memory block $923_{1-4}$ in the memory ID array 922 would need to be written to twice: once to indicate the new assigned block 915 for the address received on $W_B$ and again to indicate the new assigned block 915 for the address received on $W_C$. However, the memory blocks $923_{1-4}$ may be 1R1W memories, and thus unable to perform two writes in the same cycle. Accordingly, providing two memory ID tables $920_{1,2}$ enable the memory 905 to update one of the locations of the received address on one the tables 920 and the other location on the other table 920. That is, the memory 905 updates the four memory blocks $923_{1-4}$ to reflect the new memory location (i.e., the three bit memory block identifier) of the address received on port $W_B$ while the four memory blocks $923_{5-8}$ are updated to reflect the new memory location of the address received on port $W_C$.

However, this process results in both of the memory ID tables $920_{1,2}$ storing inaccurate data. For example, if Address X was moved to A1 and Address Y was moved to A2, memory ID table $920_1$ may be updated to reflect the change of Address X but then would not reflect the fact that Address Y has moved. The reverse would be true for memory ID table $920_2$. Accordingly, each memory ID table $920_{1,2}$ includes a memory validity array $924_{1,2}$ which indicates if a memory location stored in one of the memory blocks 923 in memory ID array 922 is valid. If memory ID table $920_1$ was updated to reflect that Address X is now located in A1 and memory ID table $920_2$ was updated to reflect that Address Y is now located in A2, the memory 905 updates the memory block 925 in memory validity array $924_1$ corresponding to Address Y to store an invalid bit and updates the memory block 925 in memory validity array $924_2$ corresponding to Address X to store an invalid bit. Moreover, if necessary, the memory 905 may update the memory blocks 925 in the memory validity arrays $924_1$ and $924_2$ corresponding to Address X and Address Y, respectively, to store valid bits.

When subsequent commands are received on the read and write ports, the memory 905 queries both memory ID tables $920_{1,2}$ to determine the memory blocks 915 which store the data associated with the received addresses. Each memory ID array $922_{1,2}$ returns a memory location (i.e., a memory block 915) for each received address. However, only one of these memory locations is valid as determined by using the received address to query the memory blocks 925 in the memory validity arrays $924_{1,2}$. So long as the memory 905 queries both memory ID tables $920_{1,2}$ when read and write addresses are received, the memory ID tables $920_{1,2}$ return a single valid memory location. Moreover, each memory block $923_{1-8}$ and $925_{1-8}$ will at most perform one write during any given cycle, thereby enabling the memory 905 to perform at least three writes simultaneously.

Figure 11:
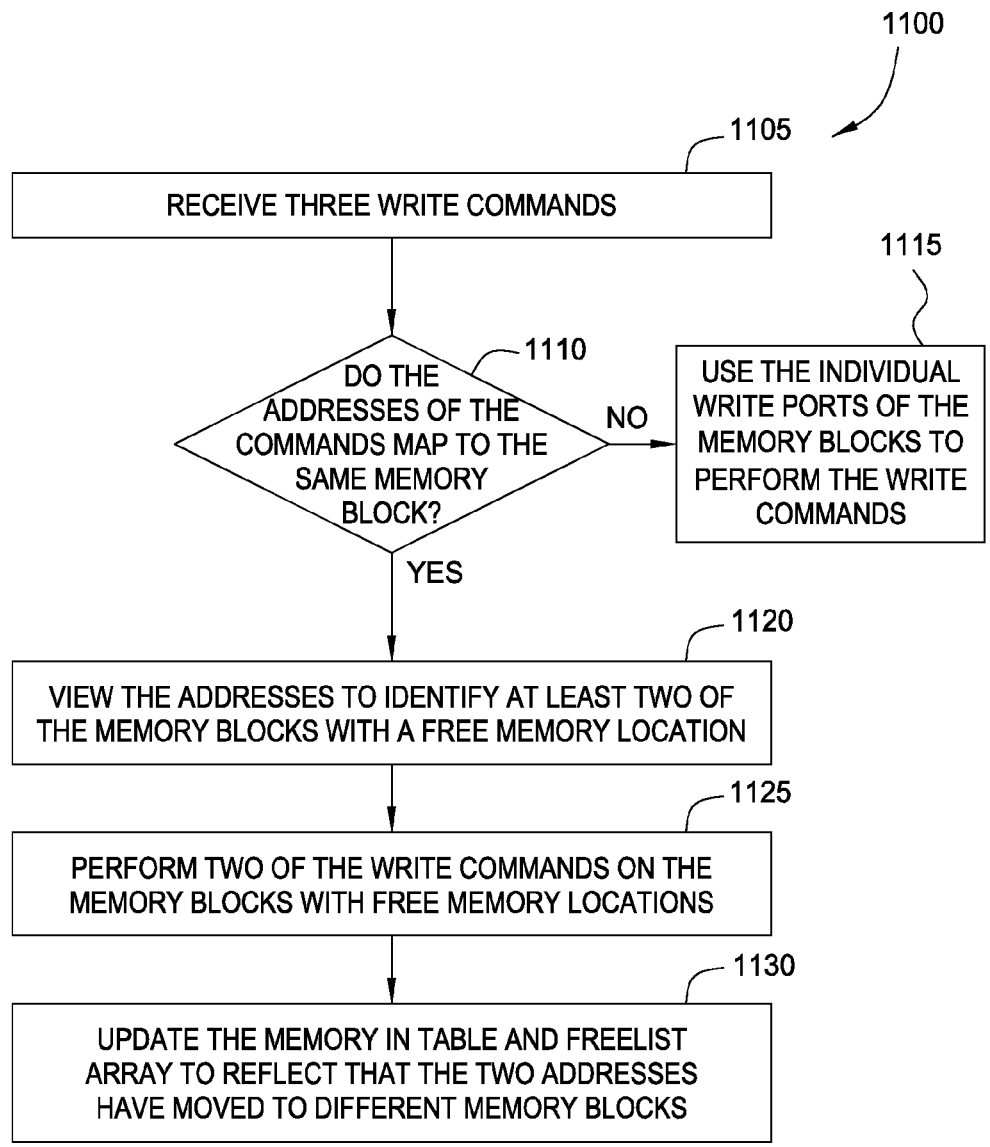
FIG. 11 illustrates a method for performing at least three write simultaneously, according to certain embodiments of the present disclosure.

FIG. 11 illustrates a method for performing at least three write simultaneously, according to certain embodiments of the present disclosure. The method 1100 is described below with references to the architecture illustrated in FIG. 9. At block 1105, the memory 905 receives three write commands on three separate write ports $W_A$, $W_B$, and $W_C$. The memory 905 routes the addresses received on these ports to the two memory ID tables $920_{1,2}$ where the addresses are used to index into the memory ID arrays $922_{1,2}$. Specifically, each address of the read and write ports is assigned to one of the memory blocks $923_{1-8}$, and thus, can be accessed in parallel. Moreover, the memory 905 also routes the received address to the memory blocks $925_{1-8}$ in the memory validity array $924_{1,2}$ which indicates if the corresponding memory location identified by the memory blocks $923_{1-8}$ in the memory ID arrays $922_{1,2}$ are valid. In one embodiment, only one of the memory ID arrays $922_{1,2}$ will store valid data for any particular address.

Once the valid memory locations of the received addresses are determined, at block 1110 the memory 905 determines whether there is a write conflict. This may either be a two-write conflict or a three-write conflict. However, for simplicity, it is assumed the received write addresses are a three-write conflict—the memory ID tables $920_{1,2}$ indicate that the addresses all map to the same memory block 915. If there is not a two-write or three-write conflict, at block 1115 the memory 905 performs the write commands on the three separate memory blocks indentified by the memory ID tables $920_{1,2}$.

As shown in FIG. 9, the memory 905 may receive a read command as well as three write commands. Because each of the memory blocks 915, 923, and 925 in FIG. 9 may be 1R1W memories, the memory 905 may perform the read command in the same cycle as the three write commands. To do this, the memory 905 routes the received read address to the memory ID arrays $922_{1,2}$ which will result in one valid memory location. Once that memory location is determined, the memory 905 accesses the respective memory block 915, retrieves the data, and transmits the data to the scheduler/controller 910.

If there is a write conflict, at block 1120, the memory 905 uses a LSB portion of at least two of the received write addresses to search the different memory units $932_{1-6}$ of the freelist array 930. Because the memory blocks 915 include two spare blocks $925_{1,2}$, the memory 905 is guaranteed to include at least two available memory locations on two different memory blocks 915 per address, or more specifically, at least two available memory locations on two different memory blocks 915 per each possible LSB portion of the received address. In the embodiment shown in FIG. 9, the memory 905 includes two available memory locations for 64 possible bit combinations—i.e., 6 LSBs. Thus, even if the two received address have the same 6 LSBs, the memory 905 contains the requisite number of available memory locations (on different memory blocks 915) to move the addresses. As noted above, this configuration may be changed to suit any addressable memory space.

Once the freelist array 930 identifies suitable substitute memory blocks 915, at block 1125, the memory 905 performs the write commands on these substitute blocks 915. Thus, each of the write commands is performed on different memory blocks 915. Once the memory 905 is initialized and begins to operate, the first time there is a conflict, the spare blocks $925_{1,2}$ may be used as the substitute blocks; however, as the memory 905 continues to detect conflicts, the selected substitute blocks may vary between any of the individual memory blocks 915.

As a result of changing the addresses to different memory blocks, at block 1130, the method 1100 updates the memory ID tables $920_{1,2}$ and freelist array 930 to reflect that the addresses' values are now being stored on different memory blocks 915. Depending on the capabilities of the underlying memory blocks making up the memory ID tables $920_{1,2}$ (i.e., the number of independent read or write ports), the memory 905 may include two separate memory ID tables $920_{1,2}$ where one table is updated to reflect that one of the addresses was moved and the other table is updated to reflect that another address was moved.

In one embodiment, the freelist array 930 may be similar to the memory ID tables $920_{1,2}$ where the memory 905 maintains two copies of the array 930. Alternatively, FIG. 10 illustrates an embodiment where instead of maintaining two copies, the freelist array 930 may include four memory blocks (X0, X1, Y0, and Y1) that correspond to one of the memory blocks 915. As shown in that figure, the mutually exclusive Free and Taken signals update at least two of the memory blocks 1015 when changing the availability bits. So long as at least one of the availability bits in the memory blocks 1015 indicates that the memory location is free, the memory 905 knows it is able to use the corresponding memory block 915 as a new location for the received address. Because two spare blocks $925_{1,2}$ are used, each memory address (or a LSB portion of a memory address) is guaranteed to include at least two available memory locations on two separate memory blocks 915. For example, if Address X is moved from A0 to A2, the memory unit $932_1$ is updated to store a free bit at Address X in two of the memory blocks while memory unit $932_3$ is updated to store a taken bit at Address X in two or more of the memory blocks. In this manner, the memory 905 is capable of performing one read and three write operations for four independent addresses as well as updating the memory elements that track and maintain the address translation functions.

In sum, embodiments presented herein include a memory for performing at least two read and one write operation in parallel. The memory may include a plurality parity blocks that are based on the data stored in other sub-blocks in the memory. When updating one of the parity blocks in response to the write operation, the other parity blocks may be used in a XOR operation. In another embodiment, a memory performs at least one read and one read-modify write operation in parallel. Here, the memory includes a latency cache for storing data from a previous read operation. The stored data is then accessed during the subsequent read-modify write operation which enables the memory to perform a read operation to any of the sub-blocks in parallel with the read-modify write. In another embodiment, a memory may include two spare sub-blocks that expand the total memory capacity to exceed the addressable space of the memory. The spare blocks ensure that there are at least two available memory locations for each associative set in the memory. Accordingly, if three addresses map to the same sub-block, the memory assigns two of the addresses to available memory locations on a different respective sub-blocks, thereby permitting the write operations to be performed in parallel.

As will be appreciated by one skilled in the art, embodiments may be embodied as a system, method or computer program product. Accordingly, aspects may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

I claim:

1. A method for performing a plurality of read operations and a write operation in parallel, comprising:
   performing a first read operation by reading data at a first memory address in a first block of addresses;
   in parallel to the first read operation, performing a second read operation for a second memory address in the first block of addresses by reading data at an address from a second block of memory addresses and a first parity block, wherein performing the second read operation comprises performing a first exclusive-or (XOR) operation using the data read from the second block of memory addresses and read from the first parity block;
   in parallel to the first and second read operations, performing the write operation by writing data to a third memory address in the first block of addresses; and
   updating a value in the first parity block in response to the write operation by performing a second XOR operation using at least the data read from at least two other parity blocks.

2. The method of claim 1, wherein the value in the first parity block is updated in parallel to the first and second read operations and write operation.

3. The method of claim 1, wherein the first block of addresses are assigned to a single physical memory block, and wherein the first and second read operations and the write operations are performed in a single memory access cycle.

4. The method of claim 3, wherein the physical memory block includes one read interface and one write interface, wherein the read interface and write interface are capable of performing only one read operation and write operation per memory access cycle.

5. The method of claim 1, wherein the second XOR operation uses the data written to the third memory address and data stored in a second block of addresses corresponding to the third memory address, wherein the data stored in the second block of address is used in a third XOR operation with the data written to the third memory address to update one of the at least two other parity blocks.

6. The method of claim 1, further comprising, updating a value in one of the at least two other parity blocks by performing a third XOR operation using at least the data written to the third memory address.

7. An apparatus, comprising:
   a memory; and
   a memory controller configured to perform multiple read operations and a write operation in parallel, comprising:
     performing a first read operation by reading data at a first memory address in a first block of addresses in the memory;
     in parallel to the first read operation, performing a second read operation for a second memory address in the first block of addresses by reading data at an associated address from a second block of memory addresses in the memory and a first parity block in the memory, wherein performing the second read operation comprises performing a first exclusive-or (XOR) operation using the data read from the second block of memory addresses and read from the first parity block;

in parallel to the first and second read operations, performing the write operation by writing data to a third memory address in the first block of addresses; and updating a value in the first parity block in response to the write operation by performing a second XOR operation using the data read from at least two other parity blocks in the memory.

8. The apparatus of claim 7, wherein the first block of address are assigned to a same physical memory block, and wherein the first and second read operations and the write operations are performed in a single cycle.

9. The apparatus of claim 8, wherein the physical memory block comprises at most one read interface and one write interface, wherein the read interface and write interface are capable of performing only one read operation and write operation per cycle.

10. The apparatus of claim 7, wherein the second XOR operation uses the data written to the third memory address and data stored in a second block of addresses corresponding to the third memory address, wherein the data stored in the second block of address is used in a different XOR operation with the data written to the third memory address to update one of the at least two other parity blocks.

11. A method for performing a read-modify write operation, comprising:

performing a read operation by reading data at a first memory address in a first block of addresses;

in response to the read operation, storing data from a second block of addresses corresponding to the first memory address into a cache;

after performing the read operation, performing the read-modify write operation by writing data at the first memory address; and while performing the read-modify write operation, updating a value of a parity block by performing an XOR operation using the data written to the first memory address and the data stored in the cache in response to the read operation, wherein addresses of the parity block are separate from the first and second block of addresses.

12. The method of claim 11, further comprising:

in parallel with the read-modify write operation, performing another read operation by reading data at a second memory address, wherein the first and second blocks of addresses are assigned to respective physical memory blocks.

13. The method of claim 12, wherein the respective physical memory blocks are able to perform only one read-modify write operation and only one read operation per cycle.

14. The method of claim 11, wherein the data stored in the cache is retrieved from one of: the parity block or a physical memory used in a different XOR operation to generate the values stored in the parity block.

15. A method for performing at least three simultaneous write operations, comprising:

receiving three write commands associated with a first memory address, second memory address, and third memory address, respectively;

determining, by querying both a first and a second memory translation table, that the first, second, and third addresses are each assigned to a first memory block of a plurality of memory blocks;

performing a first write operation to the first memory address in the first memory block; and in parallel to the first write operation:
identifying second and third memory blocks from the plurality of memory blocks that each have at least one available memory location, assigning the second memory address to the second memory block and the third memory address to the third memory block, and updating the first memory translation table to indicate that the second memory address is assigned to the second memory block and the second memory translation table to indicate that the third memory address is assigned to the third memory block, wherein the first and second memory translation tables contain address assignment data for the same memory blocks.

16. The method of claim 15, further comprising, updating an availability array to indicate that the first memory block contains two available memory locations, a memory location of the second block is assigned to the second memory address, and a memory location of the third memory block is assigned to the third memory address.

17. The method of claim 16, wherein the availability array comprises a plurality of memory units that each correspond to one of the plurality of memory blocks, and wherein the method further comprises, upon determining that the first, second, and third addresses are assigned to the first memory block, querying each of the plurality of memory units using the second and third addresses to identify the second and third memory blocks.

18. The method of claim 15, wherein the plurality of memory blocks form an addressable space comprising the first, second, and third memory address, wherein the plurality of memory blocks comprise at least two spare memory blocks that expand a total memory capacity of the plurality of memory blocks to exceed the addressable space.

19. The method of claim 15, further comprising, in parallel with the first write operation, performing a read operation by reading data from a fourth memory address assigned to one of the plurality of memory blocks.

20. The method of claim 15, further comprising, performing a second write operation to the second memory address in the second memory block and a third write operation to the third memory address in the third memory block, wherein, after performing the first, second, and third write operations, the first memory translation table comprises a first entry that the second memory address is assigned to the first memory block and the second memory translation table comprises a second entry that the third memory address is assigned to the first memory block, wherein the first memory translation table comprises a validity indicator that invalidates the first entry and the second memory translation table comprises a validity indicator that invalidates the second entry.

* * * * *